Jan. 8, 1957  M. EIGEN  2,776,596
PREPARATION AND MOUNTING OF SPECIMEN SECTIONS
Filed July 28, 1952  2 Sheets-Sheet 1
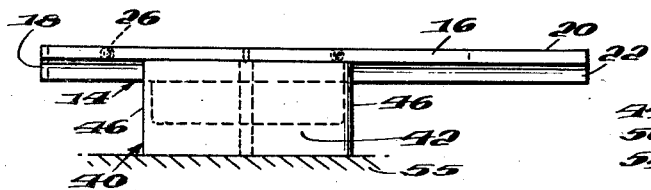
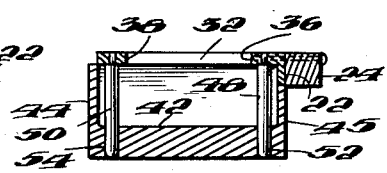
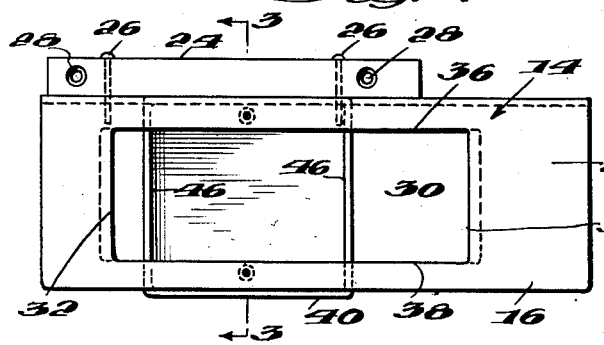
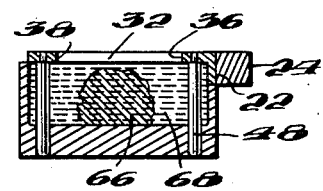
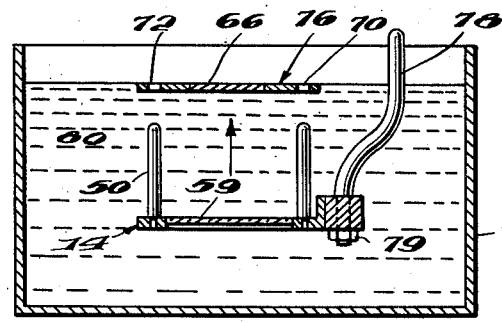
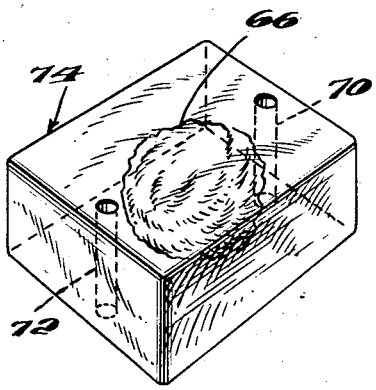
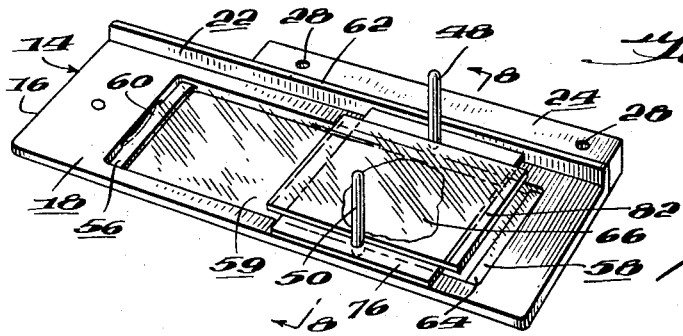
INVENTOR
MORRIS EIGEN,
ATTORNEY

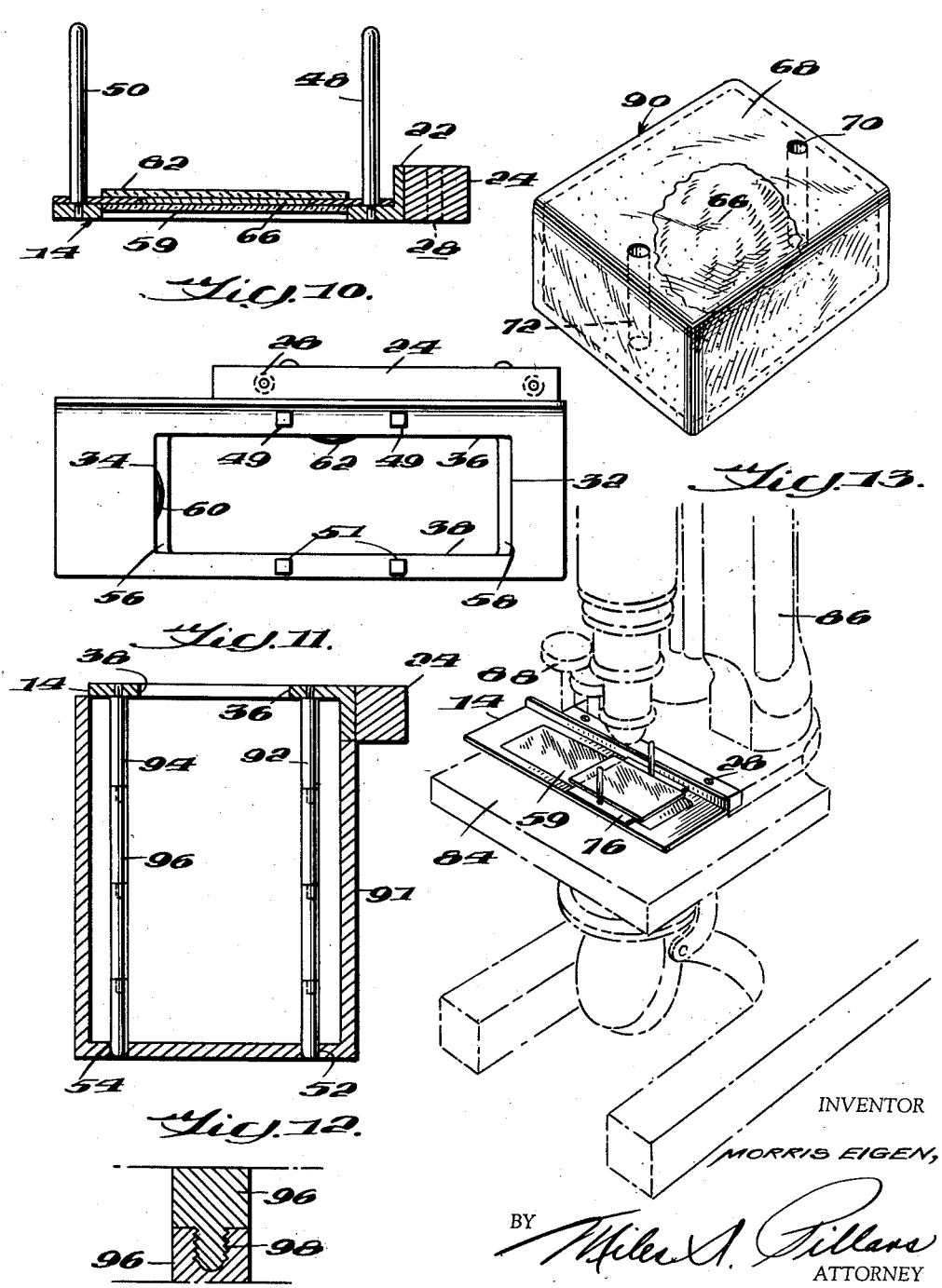

United States Patent Office 2,776,596
Patented Jan. 8, 1957

2,776,596
PREPARATION AND MOUNTING OF SPECIMEN SECTIONS

Morris Eigen, Arlington, Va.

Application July 28, 1952, Serial No. 301,415

3 Claims. (Cl. 88—40)

This invention relates to the preparation and mounting of scientific specimens, and more particularly to improved methods and apparatus for preparing and mounting on a viewing or photographing axis, separate transverse specimen sections or slices in the precise alignment and orientation in which they occurred in the specimen from which the sections were succeedingly cut.

In scientific investigations of anatomical, i. e. zoological, botanical and entomological objects both normal and abnormal in altered physiological and pathological states, it is necessary to examine and study a series of specimen sections or slices of extreme thinness cut generally on parallel planes of the specimen. The slices which are usually termed "transverse sections" may be cut on longitudinal, horizontal, or intermediately inclined succeeding planes throughout the specimen depending upon the character of the subject matter under investigation.

Although a large amount of attention has heretofore been given to the design of microtome mechanism for cutting a series of sections or slices of predetermined thickness along given planes of the specimens under study, the problems relating to the mounting of such specimens for successive viewing or photographing, particularly with respect to the orientation and alignment of the sections, have not heretofore been successfully solved. Only by viewing or photographing the separate succeeding cut sections or slices in the identical spatial orientation they possessed in the specimen from which they were taken, can the scientific worker achieve a true depth perception of the internal structure and relationships of the specimen contents, and, accordingly, ascertain with accuracy the character of the specimen existing throughout planes normal to the cutting planes of the specimen.

The problems of alignment and orientation of the separate succeedingly cut specimens for viewing and photographing purposes are particularly difficult of solution because the succeedingly cut specimens vary in size and shape so that the contour or outline of selected portions of the specimen structure cannot be relied upon for accurate visual alignment and orientation. The problems of alignment and orientation become very complex in microscopy and photomicrography techniques due to the fact that the field of view afforded by a microscope or camera adapted to record micro structures utilizing high powers of magnification is so limited that it is impossible to position with a high order of accuracy the separate succeedingly cut sections in the precise orientation in which they existed in the uncut specimen.

It is, therefore, an object of this invention to provide an improved method and apparatus for preparing a plurality of separate succeedingly cut transverse sections or slices and for mounting the separate sections for viewing or photographing aligned in the same spatial orientation that they possessed in the specimen from which they were taken, and also aligned relative to the viewing axis.

Another object of the invention is to provide an improved method and apparatus for providing individual specimen sections or slices with aligning or orientating indices or configurations by which the sections may be oriented in precise relation to each other and to the viewing axis of the observer.

Another object of the invention is to provide an improved method and apparatus by which the same instrumentality is utilized for indexing the specimen while it is being embedded in a matrix and for positioning and orienting the individual transverse sections formed therefrom on a supporting member for viewing or photographing of the specimen structure.

Another object of the invention is to provide a combined specimen embedding receptacle and transverse section supporting device to facilitate the embedding of a specimen in a matrix and after the sectionalizing of the embedded specimen, to facilitate the successive alignment of the transverse sections on the stage of a microscope or camera in the precise orientation they possessed in the uncut specimen.

Another object of the invention is to provide an improved method and apparatus by which specimens may be embedded in a matrix, and the individual transverse sections cut therefrom may be successively oriented and aligned relative to the spatial location in which they existed in the specimen without damage to the specimen sections, whereby after being secured on a rigid, transparent base they may be repeatedly mounted on and dismounted from a stage of a microscope, camera or the like.

Another object of the invention is to provide an improved apparatus in which a specimen may be cast in a matrix provided with means to form a plurality of aligning indices or configurations in the matrix adjacent to said specimen, which apparatus serves to subsequently position separately succeeding transverse sections of the specimen on a rigid, transparent plate with the aligning indices or configurations in register with the same means which formed the indices or configurations in the matrix.

A further object of the invention is to provide an improved specimen embedding receptacle and transverse section or slice supporting device which is provided with a plurality of spaced projections which serve to form aligning apertures positioned in spaced and parallel relation in the matrix at the sides of the embedded specimen, and which further serve as means for orienting each of the transverse sections during viewing or photographing.

A further object of the invention is to provide an improved separable specimen embedding receptacle and a transverse section supporting element which is provided with a plurality of spaced aligning pins, whereby the specimen is embedded in a matrix with the aligning pins extending through the matrix adjacent to the specimen, and after embedment, congealing of the matrix and formation of sectionalized specimen slices, the aligning pin-equipped element serves to support individual transverse slices upon a rigid transparent element with the pins extending into the respective apertures in the matrix they were instrumental in forming during the embedment of the specimen.

A further object of the invention is to provide an improved transverse section supporting element provided with a plurality of projections, each of which is positioned in spaced relation to each other and extends from the element in parallel relationship at substantially right angles to the supporting element.

A further object of the invention is to provide an improved transverse section supporting element provided with aligning projections which are formed by a plurality of sections rigidly secured together in end to end relation.

A still further object of the invention is to provide an improved specimen embedding receptacle for use in the embedding of specimens in a matrix which is provided with a bottom and side walls and is formed of a plastic material which may be sheared or cut simultaneously with the cutting of the embedded specimen along selected planes to form transverse sections.

Still other objects, and details of the improved method and apparatus of the invention will become apparent from the following description when considered in connection with the accompanying drawings wherein:

Fig. 1 is a front elevational view of a receptacle and an inverted specimen supporting element assembly for use in embedding the specimen in a matrix and forming aligning openings in the matrix at the sides of the specimen;

Fig. 2 is a top plan view of the receptacle and specimen supporting element assembly shown in Fig. 1;

Fig. 3 is a cross sectional view taken on lines 3—3 of Fig. 2;

Fig. 4 is a cross sectional view as shown in Fig. 3, disclosing a specimen positioned in the receptacle and embedded in the matrix;

Fig. 5 is a cross sectional view indicating the method of locating and aligning a transverse specimen section in oriented position upon the specimen supporting element;

Fig. 6 is a perspective view of a specimen embedded in the surrounding matrix with the aligning openings positioned at the sides of the specimen;

Fig. 7 is a perspective view of a specimen transverse section mounted on the specimen supporting element between a glass slide and a cover plate;

Fig. 8 is a cross sectional view taken on line 8—8 of Fig. 7;

Fig. 9 is a perspective view of an alternative specimen receptacle formed of a plastic substance;

Fig. 10 is a top plan view similar to Fig. 2 showing an alternative embodiment of the spacing and configuration of the aligning pins;

Fig. 11 is a cross sectional view of a modified form of receptacle wherein sectionalized aligning pins are employed;

Fig. 12 is an enlarged cross-sectional view of the section connections of the supporting pin shown in Fig. 11; and Fig. 13 is a perspective view of the specimen supporting element mounted upon the stage of a microscope with a transverse section supported on said element in aligned and oriented position.

While the invention is susceptible of various modifications and alternative methods and constructions, I have shown in the drawings and will hereinafter describe in detail the preferred embodiments. It is to be understood, however, that I do not intend to limit the invention to such disclosure, for I aim to cover all modifications and alternative methods and constructions falling within the spirit and scope of the invention as defined in the appended claims.

Referring to the drawings, reference numeral 14 indicates a specimen supporting element which comprises an elongated table member 16 having a generally rectangular shape and formed of relatively thin rigid material which is provided with a flat upper surface 18 and a flat lower surface 20 lying in substantially parallel planes. Figures 1 to 4 disclose the specimen supporting element 14 in an inverted position, in which position it is employed during the embedment of the specimen in a matrix as will hereafter be more fully described. Figure 7 shows the specimen supporting element 14 in position with surface 18 uppermost for supporting a transversely cut specimen during direct viewing or photography.

Specimen supporting element 14 is provided with a flange 22 which is positioned along the length of one side of table member 16 and extends upwardly at right angles a distance above the upper surface 18 of the table member. A rectangular mounting bar 24 for the specimen supporting element is preferably removably secured to the side flange 22 opposite table member 16. Bar 24 is preferably secured to and in engagement with flange 22 by the use of threaded screws 26 which pass through the bar and flange and into table member 16 and coact with corresponding threads therein. Spaced apertures 28 are provided in bar 24 for use in mounting the specimen supporting element, as will be hereinafter more fully explained.

Table member 16 of specimen supporting element 14 is provided with an enlarged generally rectangular opening 30 therein, which opening is bounded by ends 32 and 34 and sides 36 and 38. A specimen embedding receptacle 40 preferably of generally rectangular form which is provided with a bottom 42, side walls 44 and 45, and end walls 46, is adapted to be positioned beneath and in engagement with the upper surface 18 of table member 16 and flange 22 when the specimen supporting element is inverted as is shown in Figures 1 to 4, inclusive. The top edges of the end walls 46 of embedding receptacle 40 engage the upper surface 18 of table member 16 on opposite sides of opening 30, and side wall 45 is shortened an amount corresponding to the depth of flange 22 so that the edge of the flange snugly engages the top edge of the shortened side wall throughout its length.

Projecting elements or pins 48 and 50 which are mounted on table member 16 extend in parallel relationship from the upper surface 18 of the table member in a plane at right angles to the upper surface 18. Projecting element 48 is mounted on the side of table member 16 between the side 36 of opening 30 and flange 22, and projecting element 50 is mounted directly opposite opening 30 between the opening side 38 and the outer edge of table element 16. The projecting elements or pins 48 and 50 are mounted on the table element in any suitable manner, which will insure the rigidity of the mounting and insure that the pins extend normal to the upper surface 18 of the table element and parallel to each other. In the drawings the ends of pins 48 and 50 are provided with reduced diameters which frictionally coact with holes in the table member, although other securing means such as the use of threads, swaging of the parts, etc. may be utilized.

The bottom 42 of the specimen embedding receptacle 40 is provided with apertures 52 and 54 into which the ends of projecting elements or pins 48 and 50 extend when the receptacle is positioned in contact with the table supporting element in the manner shown in Figures 1 to 4 inclusive. It will be apparent that apertures 52 and 54 may comprise bores which extend into the bottom 42 as is shown in Figures 1, 3, and 4 and serve to maintain pins 48 and 50 in precision parallel position. The projecting pins 48 and 50 may be formed with a rounded or otherwise curved cross section or may be formed with a polygonal cross section. The projecting elements 48 and 50 disclosed in Figures 3, 4, and 7 are circular in cross section and the projecting elements 49 and 51 shown in the modified form in Figure 10 are square in cross section. Irrespective of the cross sectional configuration of projecting elements 48 and 50, apertures 52 and 54 are formed with a similar configuration so that when the specimen embedding receptable 40 is positioned in the manner shown in Figures 1 to 4 the ends of projecting pins may be inserted and will fit snugly with a frictional fit into apertures 52 and 54, thereby supporting the terminal ends of the projecting elements and the receptacle in juxtaposition with respect to the elongated table member 16. The terminal ends of the projecting pins are rounded to facilitate their insertion into apertures 52 and 54 and also to facilitate the mounting of specimen slices on the supporting device as will hereinafter be more fully described.

The upper surface 18 of table 16 is provided with recessed portions 56 and 58 extending across ends 32 and 34 respectively of opening 30 so that a microscope slide 59 may be supported on the surfaces of the recessed portion within opening 30 with the upper surface of the glass flush with the upper surface 18 of the table element. Biasing elements in the form of outwardly bowed springs 60 and 62 are pinned at each of their respective ends into the table member adjacent to the edges of opening 30. Spring 60 is positioned below the upper surface 18 of table 16 and above the supporting surface of recess 56 for the purpose of biasing the microscope slide 59 toward end 34 of opening 30, and spring 62 is positioned a similar depth below the upper surface 18 on the side 36 of opening 30 intermediate the ends 32 and 34 to bias the microscope slide toward side 38 of opening 30. The combined effect of springs 60 and 62 is to bias a microscope slide inserted in opening 30 and resting in recesses 56 and 58 to a position with the corresponding side and ends in contact with side 38 and the corner 64 of glass 59 in contact with the corner of opening 30 formed by side 38 and the recess ledge of side 34. The use of springs 60 and 62 insures a precision location of each slide in opening 30 irrespective of slight dimensional differences of the microscope slides and the number of times they are mounted and dismounted from the specimen supporting element 14.

Specimens are prepared and mounted for direct viewing, microscopy, and photomicrography by using the aforedescribed apparatus in the following manner. A specimen identified by reference numeral 66 is placed within the central interior portion of the embedding receptacle 40 and the supporting element 14 and receptacle are assembled with the supporting element in inverted position as shown in Figures 1 and 3, and with the terminal ends of projecting pins 48 and 50 located in apertures 52 and 54 respectively. When positioned in this manner the specimens 66 will be spaced a distance from the side and end walls of receptacle 40 and will be positioned a spaced distance from projecting pins 48 and 50. The assembled supporting element 14 and receptacle 40 are preferably positioned on a substantially horizontal supporting surface identified by reference numeral 55 with the specimen 66 contained within the receptacle resting upon the bottom thereof. A sufficient quantity of a matrix forming material 68 in fluid state is then poured into the interior of the receptacle through opening 30 in the supporting element to substantially fill the receptacle and embed the specimen therein. Various matrix forming material may be used depending upon the character of the specimen and the type of an investigation being conducted, such, for example, as a concentrated solution of pyroxylin known as celloidin, paraffin or synthetic resins and waxes. The composition of the matrix forming material forms no part of the present invention, and it is contemplated that any suitable embedding substances may be employed which congeal or solidify by evaporation of solvents, cooling, polymerization, or copolymerization, and which serve to embed the specimen without changing its structure. The supporting element 14 and receptacle 40 are maintained in the assembled position shown in Figure 4 during the congealing or solidification of the matrix forming material. After the matrix forming material has hardened, the supporting element 14 and receptacle 40 are carefully separated to prevent damage to the matrix and the specimen embedded therein. During the separation of these elements, projecting pins 48 and 50 are withdrawn from the solidified matrix, leaving apertures 70 and 72 extending through the matrix between the upper and lower surfaces thereof and positioned adjacent the sides of the embedded specimen. The cast matrix 74 shown in Figure 6 including the specimen 66 embedded therein is subsequently removed from the receptacle 40 in which it was molded.

After removal from the receptacle 40, matrix 74 and the embedded specimen 66 are section-cut into succeeding slices of desired thinness by the use of conventional techniques and microtomes of any suitable construction. The resulting transverse sections 76 of the matrix and specimen are fragile and easily damaged and preferably the sections are mounted on the specimen supporting element by a flotation process. By this procedure each of the transverse sections are transferred after cutting by a microtome mechanism to the surface of a liquid such as is represented by reference numeral 80 which is confined in a container 77 shown in Fig. 5. The container may contain water, formaldehyde solution or other liquids compatible with the matrix and specimen upon the surface of which the sliced sections float due to their buoyancy. The specimen supporting element 14 with a glass plate 59 fitted into opening 30 and spring biased to a predetermined position as aforedescribed, is immersed beneath the liquid surface with surface 18 of the table member 16 and projecting pins 48 and 50 upwardly directed. A detachable handle 78 is attached to the specimen supporting element 14 in any suitable manner for manipulating the element while it is immersed in liquid 80. As shown in Figure 5 the handle 78 which comprises a rigid elongated shaft is attached to the element by passing through one of the apertures 28 in bar 24 and secured in place by a nut 79. Handle 78 extends upwardly at substantially right angles from the plane of table member 16. The glass plate equipped supporting element 14 after immersion in liquid 80 beneath the floating specimen 76 is moved upwardly by handle 78 in the direction of the arrow shown in Figure 5, with the projecting pins centered in respect to apertures 70 and 72. Continued upward movement of the supporting element 14 serves to bring the table member 16 and glass plate 59 in contact with the floating specimen 76, after which the specimen may be lifted from the liquid while supported on the element in aligned position resulting from the co-action of pins 48 and 50 with openings 70 and 72.

After transfer of the transverse specimen section 76 from liquid 80 and mounting in aligned position upon element 14, the specimen may be subjected to known treating techniques, such as staining and the like, after which cover glass 82 is superposed in contact with the specimen as is shown in Figures 7 and 8 of the drawings. Upon completion of the above procedure and after the specimen has been permitted to set and become fixed by adhesion in the previously oriented and fixed position on the slide supported by element 14, the edges of the specimen containing the aligning openings 70 and 72 which extend beyond the opposite edges of glass plate 59 may, if desirable, be removed. It will be apparent that at this stage of the process the openings have served their function of aligning the transverse specimen with respect to the position in which the section slices existed in the uncut specimen. Each of the succeedingly cut sections is mounted on a separate glass mounted on the supporting element 14 in an oriented position in a similar manner to that above described.

The specimen supporting element 14 may be provided with a lamp house and a diffusion screen (not shown) positioned beneath opening 30 for use during direct viewing of the succeedingly cut sections or the supporting element 14 may be mounted upon the stage 84 of a microscope 86 for microscopic or photomicrography investigations. As shown in Figure 13, apertures 28 in bar 24 are utilized for securing the specimen supporting element 14 on the stage of microscope 86 to the conventional traversing mechanism generally indicated by reference numeral 88. Due to the fact that the transverse specimens have been spatially oriented with respect to each other and with respect to the position in which they existed in the uncut specimen, succeedingly mounted specimens may be viewed or photographed to obtain a true depth perception of the internal structure throughout the depth of the original specimen on the cutting planes.

An alternative embodiment of a specimen embedding receptacle is disclosed in Figure 9 wherein the receptacle 90 is formed of a material which may be cut by the microtome mechanism. In this embodiment the embedding receptacle 90 is preformed in accordance with the description of receptacle 40 except that the material used to preform the receptacle comprises a hardening substance, such as paraffin, which has sufficient rigidity to hold its shape, but which is pliable and may be cut during the sectioning of the matrix and specimen. The assembly of receptacle 90 with supporting element 14, the embedding of the specimen in a matrix forming material, and the subsequent sectionalizing of the specimen are accomplished in the manner previously described except that the specimen and matrix remain within the walls of the receptacle 40 during the cutting of the transverse sections of the receptacle, matrix and specimen.

It will be apparent that the projecting elements 48 and 50 which serve to provide the orienting apertures in the cut and uncut matrix surrounding the specimen may be provided with various configurations, such for example as the rectangular configuration shown in Figure 10. Further, this invention contemplates that two or more projecting pins positioned in spaced relation may be employed on each side of opening 30 in elongated table member 16. Figure 10 discloses the use of two pins located in spaced relationship on each side of opening 10, although it will be apparent that one or more pins may be employed on a side for providing orienting apertures in the matrix surrounding the specimen.

Oftentimes in anatomical investigations it is desired to study the internal structure and condition of specimens having a relatively elongated shape. Figure 11 discloses a modified form of specimen embedding receptacle identified by reference numeral 91 which may be assembled in the aforedescribed manner with the specimen supporting element 14. Receptacle 91 is provided with side walls having a greater depth than those of receptacle 40, although in other respects receptacle 91 is similar in construction to the aforedescribed receptacles. The projecting elements or pins 92 and 94 are formed of a plurality of detachable sectional units represented by reference numeral 96 which provide sufficient length to permit the terminal ends to engage the apertures 52 and 54 in the bottom of the receptacle. The sections intermediate the ends of the supporting pins are provided with threaded recesses 98 at one end thereof and complementary formed and threaded projecting elements at the opposite ends thereof. The sections 96 are secured in threaded engagement to form the projecting pins 92 and 94 which extend at right angles from the specimen supporting element 14 and in parallel relation to each other. After embedment of an elongated specimen and the removal of the matrix and specimen, the projecting elements 92 and 94 may be shortened by removing sections 96 therefrom prior to mounting of the individual transverse sections in the manner previously described.

I claim:

1. A method of preparing and mounting specimen sections, comprising the steps of positioning a specimen in a receptacle, inserting a plurality of spaced projecting elements supported from a supporting element into said receptacle adjacent to the sides of said specimen, filling the said receptacle with a congealable matrix material substantially to embed said specimen and the portion of said projecting elements located at the sides of said specimen, after congealing of the matrix material, removing said projecting elements from the matrix to provide aligning openings therein, and removing said specimen and matrix from said receptacle, forming a plurality of transverse sections from said specimen and said matrix, each of which contains said aligning openings, securing a glass plate in a fixed and oriented position on said supporting element, and mounting a transverse section on said supporting element in contact with said glass plate with the projecting elements extending through the aligning openings formed by the respective elements during the congealing of the matrix material.

2. A device for preparing and mounting specimen sections comprising a specimen receptacle provided with a bottom and side walls, said bottom having formed therein spaced apertures adjacent to opposite side walls, a specimen supporting element comprising an elongated plate having means to define an opening therethrough, recessed portions positioned at each end of said opening which are adapted to receive and support a glass plate, and spring means mounted on said element and positioned at adjacent sides of said opening for engaging and biasing said glass plate toward the opposite sides of said opening, projecting elements supported by said element and positioned on opposite sides of said opening which extend outwardly in the same direction from said elongated plate, said terminal ends of said projecting elements adapted to be inserted with a frictional fit into said apertures when said specimen receptacle is juxtapositioned with respect to said supporting element whereby the device can be used as a mold for embedding the specimen and after sectioning the embedded specimen as an aligning and supporting means for the sections.

3. A device as described in claim 2 wherein the projecting elements are formed of a plurality of sectional units secured together in end to end relationship.

References Cited in the file of this patent

UNITED STATES PATENTS

| 239,357 | Williamson | Mar. 29, 1881 |
| 1,135,538 | McCord | Apr. 13, 1915 |
| 1,612,201 | Millican | Dec. 28, 1926 |
| 1,797,694 | Ott | Mar. 24, 1931 |
| 1,971,722 | Mann | Aug. 28, 1934 |
| 2,300,495 | Gerhart | Nov. 3, 1942 |
| 2,444,729 | Crockwell | July 6, 1948 |
| 2,614,454 | Steffen | Oct. 21, 1952 |